June 14, 1938.  A. J. HOLMAN  2,120,249
SOUND AND PICTURE APERTURE UNIT AND FILM FEEDING MECHANISM
Filed Dec. 14, 1934  2 Sheets-Sheet 1
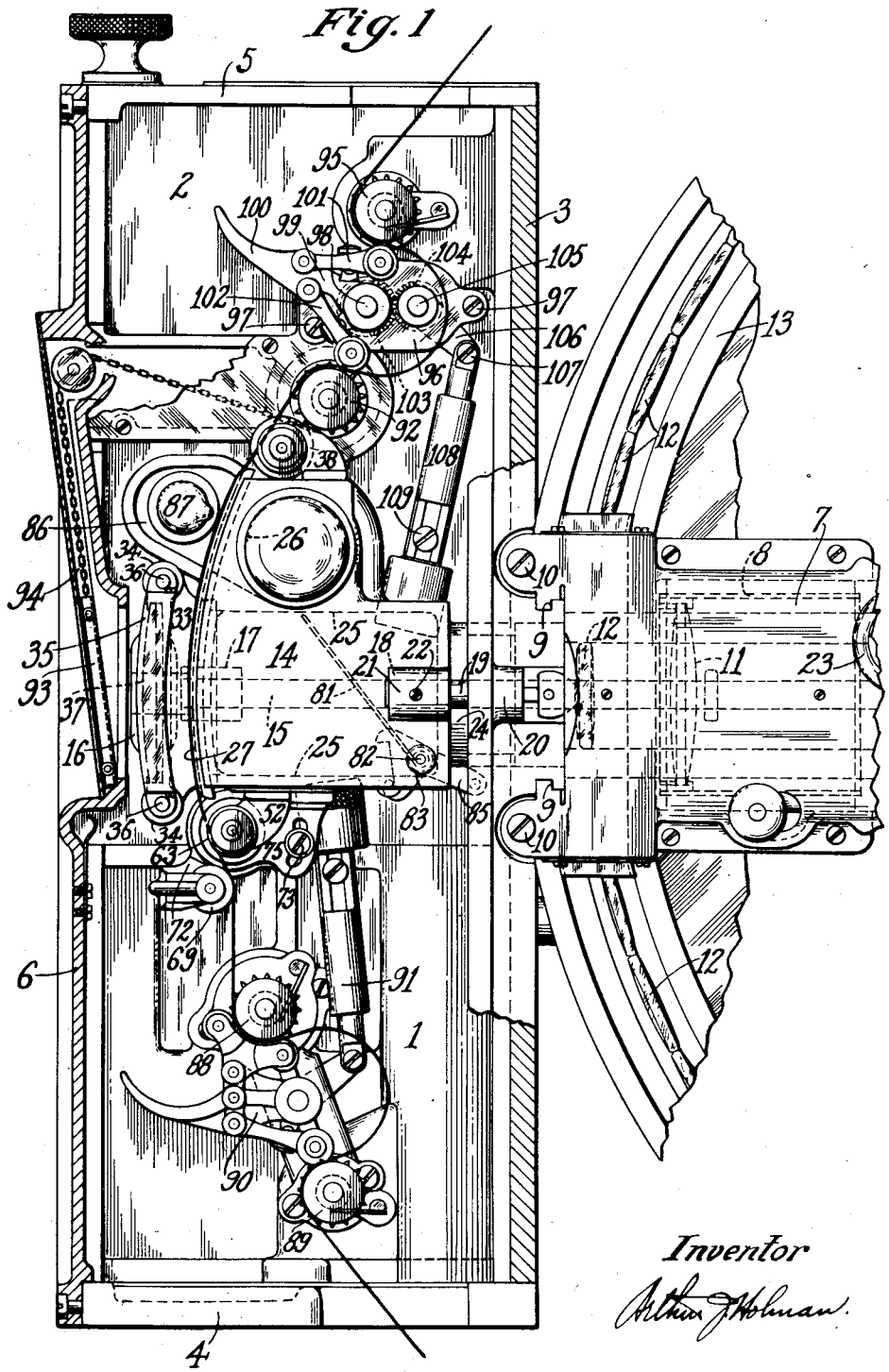
Inventor
Arthur J. Holman June 14, 1938.  A. J. HOLMAN  2,120,249
SOUND AND PICTURE APERTURE UNIT AND FILM FEEDING MECHANISM
Filed Dec. 14, 1934   2 Sheets-Sheet 2
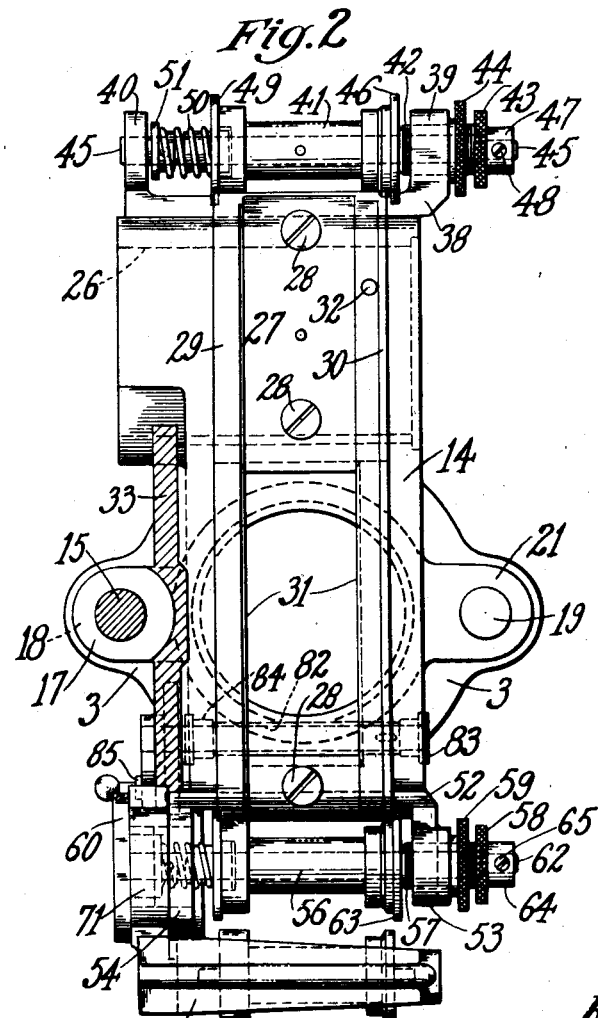
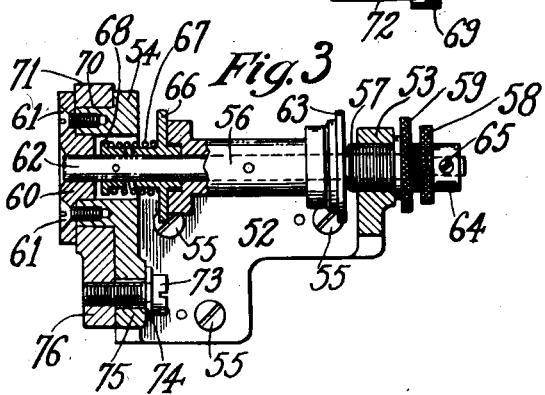
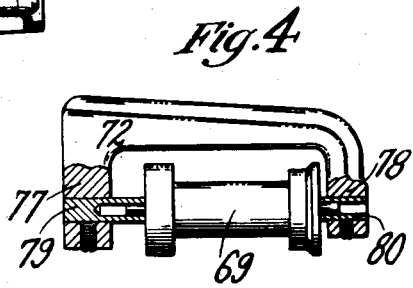
Inventor
Arthur J Holman Patented June 14, 1938

2,120,249

UNITED STATES PATENT OFFICE 2,120,249

SOUND AND PICTURE APERTURE UNIT AND FILM FEEDING MECHANISM

Arthur J. Holman, East Orange, N. J.

Application December 14, 1934, Serial No. 757,451

8 Claims. (Cl. 88—16.2)

My invention relates to a sound and picture aperture unit and film feeding mechanism associated therewith in a motion picture projector wherein the film strip is moved at constant velocity across the aperture plates, the projected screen image being formed by means of an optical rectifying system of the type shown in Letters Patent of the United States No. 1,957,457, dated May 8, 1934. The present invention, which is an improvement over the mechanism for exhibiting sound motion pictures described in Letters Patent of the United States No. 1,987,623, dated January 15, 1935, differs essentially from my former apparatus in four respects, namely:—there is no gate mechanism and there are no tension shoes, the film strip being held in contact with the curved aperture plates entirely by tension applied thereto through the fire shutter control sprocket located above the aperture unit and the film feed sprocket located below the aperture unit; no sprockets are mounted on the aperture unit, but the film strip is positioned laterally on the aperture plate by means of flanged guide rollers; two paired sprocket units of the type shown in co-pending patent application, Serial No. 756,764, filed Dec. 10, 1934, constitute the entire film actuating means within the projector; and the aperture feed sprocket is so positioned that a guide roller adjustably mounted on the aperture unit, will permit displacement of the aperture along the optical axis, for "combined focus and image placement" adjustment, without affecting the framing of the projected image.

The objects of my invention are to reduce the cost of manufacture, improve the construction and operation, and simplify the threading, of my sound film projector. It has also been my object to further reduce the wear and stress to which the film strip is subjected during projection, and, insofar as possible, to eliminate damage to film patches (splices), which damage determines, in large measure, the service life of the film. These and other advantages herein later enumerated, are secured primarily through the use of paired sprocket units in the manner hereinafter more fully described.

My invention may be best understood by reference to the accompanying drawings in which—

Fig. 1 is a view of the operating side of my sound motion picture projector mechanism with parts of the case cut away to show the construction.

Fig. 2 is a rear elevation of the aperture unit shown in Fig. 1, the aperture lens supporting bracket being cut away to show the aperture plate.

Fig. 3 is a bottom view of the bracket and lateral guide roller located below the aperture plate, with parts sectioned to show method of supporting the associated adjustable roller.

Fig. 4 is a bottom view of the adjustable roller and its bracket with parts cut away to show how roller is journaled.

Referring now more specifically to the drawings, in which like reference numerals indicate like parts, 1 is the lower main frame member to which is bolted the upper main frame member 2, and to each of these members is bolted the front plate 3; these three parts forming the main frame of a non-intermittent projector mechanism to which is bolted the base plate 4, the top cover plate 5, and the rear cover plate 6. A lens tube bracket 7, carrying slidably mounted lens tube 8, is secured to front plate 3, by the tongue and groove construction shown at 9, and is held in position by screws 10. The front component 11, of the objective system, is carried in the lens tube 8, and the rectifying lens elements 12, which in turn become the rear components of the objective system, are suitably secured to the lens wheel 13, which is rotatably supported in proper relation to the mechanism and is operated by the mechanism gear train.

An aperture frame 14, is slidably mounted within the mechanism on the optical axis of the front component 11, in the following manner:— A stud 15, is press fitted at its forward end into front plate 3, and its rear end fits snugly into bracket 16, which is secured to upper main frame member 2, by suitable screws. The bosses 17 and 18, integral with aperture frame 14, are a snug sliding fit on stud 15, and a stud 19, which slides snugly in a bore in the boss 20, on front plate 3, is secured in boss 21, integral with aperture frame 14, by the set screw 22. A hand wheel 23, carried on lens tube bracket 7, and operating through a suitable mechanism (not shown), enables the projectionist to correctly position aperture frame 14, and front component 11, with respect to rectifying lens elements 12, for any amount of film shrinkage. The laws of optics involved, and mechanism suitable for making these adjustments, are fully disclosed in Letters Patent of the United States No. 1,857,152 dated May 10, 1932. The aperture frame 14, has integral annular boss 24, which projects forward through a clearance hole in front plate 3, the axis of the bore in boss 24, coinciding with the optical axis of front component 11. Within aperture frame 14, is a cavity 25, symmetrically positioned with respect to the optical axis, through which the screen image is projected, and above cavity 25, is cylindrical cavity 26, within which is contained a suitable photo-electric cell. A hardened steel curved aperture plate 27, is attached to the curved rear surface of aperture frame 14, by the screws 28 (Fig. 2). Aperture plate 27, has integral wide raised curved track 29, and narrow raised curved track 30, and contains picture aperture 31, and sound aperture 32, picture aperture 31, being symmetrically positioned with respect to the optical axis of component 11, and sound aperture 32, being positioned opposite cylindrical cavity 26, which contains the photo-electric cell.

An integral web 33, (Fig. 1) projecting backward from aperture frame 14, carries the bosses 34. A lens mount 35, has press fitted therein pins 36, which project into bores in the bosses 34, and thereby support lens mount 35, on the aperture frame in close proximity to aperture plate 27. A sphero-cylindrical aperture lens 37, suitably retained in lens mount 35, is symmetrically positioned with respect to picture aperture 31. Aperture lens 37, functions in conjunction with a sphero-cylindrical condenser lens, and acts to so converge the light beam issuing from the condenser that the image ray bundle will be substantially circular in cross-section at the position, where it is cut by rectifying lens elements 12, as they are carried around by the rotation of the lens wheel 13.

A bracket 38, (Fig. 2) having integral bosses 39 and 40, is secured by screws to the top face of aperture frame 14, and within these bosses the guide roller 41, is adjustably mounted in the following manner:— The boss 39, contains a threaded bore into which is screwed the externally threaded journal box 42, having knurled head 43, the journal box being locked in any desired position within boss 39, by knurled lock nut 44. The boss 40, contains a bore which is in alignment with and of the same diameter as the bore in journal box 42, and within these bores is journaled the roller shaft 45. The roller 41, having one integral flange 46, is pinned to shaft 45, and is retained in contact with one end of journal box 42, by the collar 47, which contacts with the opposite end of journal box 42, and is held on shaft 45, by the set screw 48. A slidably mounted loose flange 49, is pressed toward roller 41, by coil spring 50, which abuts at one end against flange 49, and at the other end against flanged collar 51, which is pinned on shaft 45. The structure just described provides convenient means for accurately aligning integral flange 46, on guide roller 41, with the outer edge of narrow raised curved track 30, on aperture plate 27; and loose flange 49, under influence of coil spring 50, insures that the film strip will be crowded against integral flange 46, thus accurately positioning the film strip laterally with respect to the aperture plate as it enters upon the curved tracks 29 and 30, thereon.

A bracket 52, (Figs. 2 and 3) having integral bosses 53 and 54, is secured by screws 55, to the lower face of aperture frame 14, and within these bosses the guide roller 56, is adjustably mounted in the following manner:—The boss 53 contains a threaded bore into which is screwed the externally threaded journal box 57, having knurled head 58, the journal box being locked in any desired position within boss 53, by knurled lock unit 59. The boss 54, contains a bore in alignment and concentric with the bore in journal box 57, into which is fitted the flanged journal box 60, which is retained in boss 54, by screws 61. The roller shaft 62, is carried in journal boxes 57 and 60. The roller 56, having one integral flange 63, is pinned to shaft 62, and is retained in contact with one end of journal box 57, by the collar 64, which contacts with the opposite end of journal box 57, and is held on shaft 62, by the set screw 65. A slidably mounted loose flange 66, is pressed toward roller 56, by coil spring 67, which abuts at one end against flange 66, and at the other end against flanged collar 68, which is pinned on shaft 62. The lower guide roller structure just described, is substantially the same as the upper guide roller structure, and its function is similar. The aperture upper and lower guide rollers, functioning as a unit, insure exact lateral alignment of the film strip with the aperture plate as the film strip is moved thereover by the aperture feed sprocket.

Associated with the lower lateral guide roller 56, is the adjustable roller 69, which is hingedly mounted about the axis of roller 56, in the following manner:—The boss 54, (Figs. 2 and 3) has a turned portion 70, of reduced diameter, and an annular boss 71, integral with the bracket 72, is bored to fit with very slight clearance over turned portion 70, of boss 54, and is retained thereon by the flanged journal box 60, retained, as hereinabove described, in boss 54, by screws 61. A screw 73, provided with washer 74, projects through a slotted lug 75, integral with bracket 52, and enters a tapped hole in lug 76, integral with boss 71, on bracket 72, and, when tightened, retains bracket 72, in any desired angular position with respect to bracket 52. Integral with bracket 72, (Fig. 4) are the lugs 77 and 78, each of which contains a bore in alignment with the bore in the other, and therein is mounted respectively the drilled stud 79, and the bushing 80, wherein the roller 69, is journaled. The roller 69, may be aligned with lateral guide roller 56, by loosening set screws in lugs 77 and 78, and adjusting drilled stud 79, and bushing 80, in an axial direction, being careful to see that roller 69, is free from end play before the set screws are again tightened. The correct adjustment of the roller 69, with respect to the aperture unit, i. e. the angular position of the bracket 72, is determined by the relative positions of the aperture unit and the aperture feed sprocket, as will be hereinafter fully described.

Within the cavity 25, in aperture frame 14, is hingedly mounted the change-over shutter 81 (Figs. 1 and 2). The shutter is rigidly attached to the shaft 82, which turns freely in bushings 83 and 84, press fitted in aperture frame 14, and is operated by means of the usual change-over magnet unit which is linked to the ball crank 85, the latter being press fitted on shaft 82.

The sound pick-up system, which includes the photo-electric cell, the exciter optical system and the exciter lamp, is mounted on a bracket supported within the cylindrical cavity 26, in the upper part of aperture frame 14, the bracket projecting through a clearance hole 86, in upper frame member 2. A sound pick-up system of the type shown diagrammatically in Figs. 1 to 5 inclusive, in Letters Patent of the United States No. 2,036,275, dated April 7, 1936, not only provides a superior scanning line, but also removes the exciter lamp from the film compartment of the projector, and lends itself beautifully to unit construction of the sound system. Such a sound pick-up unit constitutes a separate and distinct invention, hence it is fully described and explained in co-pending patent application Serial No. 758,429, filed December 20, 1934. In Fig. 1 of the attached drawings, 87 is the end of the tube containing the exciter optical system. The photo-electric cell is contained within the cylindrical cavity 26, as has already been explained.

A paired sprocket unit, including aperture feed sprocket 88, take-up sprocket 89, idler supporting mechanism 90, and idler closing mechanism 91, is mounted on lower main frame member 1, in the manner specified in co-pending patent application, Serial No. 756,764, filed Dec. 10, 1934, the axis of aperture feed sprocket 88, being positioned 2 inches below the lowest position of the axis of adjustable roller 69, and a fixed distance ahead of the mean position of aperture plate 27, for reasons hereinafter explained in connection with adjustments of the aperture unit for variation in shrinkage of film. The construction of this paired sprocket unit is a matter of invention separate and distinct from the present apparatus, and full data thereon is given in the above mentioned co-pending application.

Above the aperture unit is fire shutter control sprocket 92, which is rotatably mounted on a gearless centrifugal mechanism contained in a case attached to the back of upper main frame member 2, as is more fully described in copending patent application Serial No. 756,036, filed December 5, 1934, which application relates to an improvement in fire shutter and operating mechanism. For the purposes of the present application it will be sufficient to state that the centrifugal mechanism, when operating to retain fire shutter 93, in open position, i. e. at the top of its guideway 94, applies a load to sprocket 92, thereby providing tension on that portion of the film strip overlying the aperture plate 27, the film strip being there actuated, of course, by aperture feed sprocket 88. Tension thus applied to the film strip by loading fire shutter control sprocket 92, retains the film continuously in contact with the raised curved tracks on the aperture plate and in proper operating position on the aperture unit guide rollers, hence there is no need for the usual gate, tension shoes etc., at the aperture.

Upper feed sprocket 95, secured to a power driven shaft journaled in upper main frame member 2, is so positioned with respect to fire shutter control sprocket 92, that a common idler system may be used to retain the film strip in engagement with both sprockets. In other words, the upper feed sprocket, the fire shutter control sprocket, and their common idler mechanism constitute a unit, the upper frame member itself being the yoke which maintains constant spacing between the sprockets. A somewhat different idler mechanism is used in this paired sprocket unit, so that the idler operating mechanism may be conveniently located in the available space, but the general scheme and the ultimate operation are substantially the same as in the case of the paired sprocket unit mounted on the lower main frame member. The construction of this idler mechanism is as follows:—A gear box 96, is attached to upper main frame member 2, by screws 97, and in the front and rear walls of gear box 96, is journaled the idler supporting shaft 98, to which is securely attached the idler supporting member 99, having integral finger grip 100. Hingedly attached to idler supporting member 99, are the yokes 101 and 102, carrying at their free ends rollers which maintain the film in engagement with sprockets 95 and 92, when the idler mechanism is in operating position. Within the gear box 96, and press fitted on idler supporting shaft 98, is the gear 103, which meshes with the gear 104, press fitted on the shaft 105. Shaft 105, is journaled in the walls of gear box 96, and carries fast mounted on its rear end, which projects through the rear wall of gear box 96, the crank member 106, to the swinging end of which is hingedly attached by screw 107, the idler operating mechanism 108, which is itself hingedly attached to upper main frame member 2, by the screw 109. The operation of this idler mechanism is so obviously like that described in the above mentioned co-pending patent application Serial No. 756,764, that further explanation herein is unnecessary.

In threading my projector, the first operation is to apply pressure downwardly to the finger grip of each of the two paired sprocket units till the idler mechanism associated therewith locks in open position. The four sprockets are then clear, and film may be threaded through the entire mechanism and over both sound and picture apertures. When inserting the film, care is required only to insure that teeth on all four sprockets enter perforations in the film, that the film is entered between the flanges of the aperture unit lateral guide rollers, and that proper loops are formed between paired sprockets. After the film is thus inserted, the idler locking means is tripped, and the entire threading operation is then completed.

Any apparatus designed to project motion pictures from a film strip which moves continuously (non-intermittently) across the aperture plate, is impractical unless it embodies some simple and effective means whereby its optical rectifying system may be instantly adjusted during projection, to accommodate films which vary, one from the other, in the extent to which shrinkage has occurred in the base materials constituting the film. In the revolving lens wheel type of optical rectifying system, I have found it most effective to make the adjustment for variation in film shrinkage, by providing freedom of movement, along the optical axis, for the aperture unit and the front component of the objective system. This arrangement provides the essential gradually progressive adjustment whereby the optical system may be exactly accommodated to any film no matter what its shrinkage factor may be. In my former projector mechanisms, I have mounted the aperture feed sprocket directly on the aperture unit, and it has been necessary to use a rather involved linkage and gear train to drive the aperture feed sprocket and allow movement of the aperture unit along the optical axis, and, at the same time, not disturb the framing of the projected image. The use of paired sprocket units as herein specified, requires that all sprockets be mounted on fixed frame members, hence my former gear linkage system is not applicable to the present device. However, I have found a very simple and effective means for permitting axial adjustment of the aperture unit without affecting the framing of the projected image.

The average run of film in circulation through commercial exchanges, when compared reel against reel, will very seldom show a variation in shrinkage in excess of 1.5 per cent, and, in the vast majority of cases, the variation will not exceed one per cent. The 1.5 per cent limit includes the entire range, from films which are fresh from the processing laboratories, and hence show but slight shrinkage, to old, badly worn, "cooked" films, which have been dried out by much service in intermittent projectors wherein intense light is used at the aperture. The optical rectifying system used in the present device, requires an axial displacement of the aperture plate amounting to .077 inch, to accommodate the system to films differing by 1.5 per cent in shrinkage, hence the problem, as regards aperture movement without affecting framing of the screen image, is solved if provision is made for moving the aperture unit through a distance of .077 inch without thereby shifting the screen image. As shown in Fig. 1 of the accompanying drawings, provision is made in the mechanism for displacing the aperture unit over a much greater range than that required to accommodate the optical system to a 1.5 percent shrinkage difference, and the reason is that different lens wheels may be inserted in the mechanism, hence, if the focal length of rectifying lens elements on one wheel differs from the focal length of elements on another wheel, the initial setting of the aperture unit will be different.

To minimize the effect on framing produced by axial adjustment of the aperture unit, it is necessary that the straight portion of the film strip, situated between the aperture feed sprocket 88 and the adjustable roller 69, stand normal to the optical axis when the aperture unit is so adjusted, with respect to a given lens wheel, as to exactly register on the screen, the images of successive film frames projected from a film having the average value of shrinkage. To state it conversely and in the manner in which the mechanism is actually adjusted; a film with a shrinkage of the average amount, is threaded and run, and, while the mechanism is operating, the optical system is so adjusted that the screen image indicates perfect registration of the images of successive film frames. The motor is turned off before the film has run through the mechanism, the screw 73 is loosened and the bracket 72 is swung to such position that the straight portion of the film strip situated between roller 69 and aperture feed sprocket 88, stands exactly at right angles to the optical axis, i. e. to the direction of motion of the aperture unit. When the adjustable roller 69 is so positioned, the screw 73 is tightened, thus definitely establishing the position of roller 69 with respect to the lower lateral guide roller 56 and the aperture plate 27. To accommodate the optical system to film having the minimum amount of shrinkage, the aperture unit is backed away from the lens wheel elements to the extent of .0385 inch, and to accommodate film having the maximum shrinkage, the aperture unit is moved forward of the above described mean position by the same amount, i. e. .0385 inch. As hereinbefore stated, the aperture feed sprocket is so positioned below the aperture unit, that the straight portion of the film strip situated between roller 69 and sprocket 88, is at least 2 inches in length, therefore a shift of the aperture unit (which includes roller 69) to the extent of .0385 inch either way from its mean position, will increase the length of said straight portion of film by something less than .0004 inch. Stated mathematically, the aperture feed sprocket, rollers and aperture plate are so positioned relatively, that the variable angle between a tangent to sprocket 88 perpendicular to the optical axis and a tangent common to sprocket 88 and roller 69, remains so small, during the required aperture adjustment, that its cosine is equal to unity for all practical purposes. Thus the aperture unit may be shifted, in adjusting the optical system to accommodate films having normal amounts of shrinkage, without disturbing the relative position of film frames travelling continuously across the aperture except to the extent of .0004 inch, which, of course, is too small an amount to be visible at the screen as a change in framing.

Several of the advantages possessed by my present device, as compared with my former sound projector mechanism, have already been indicated, but it seems in order to call particular attention to the following:—Simplified, unit construction; elimination of gate and tension shoes from the aperture unit; complete severance of connection between aperture unit adjustment and framing mechanism; provision on aperture unit for mounting improved sound pickup unit. The present film feeding mechanism and aperture unit eliminate all rubbing contacts with the film strip with respect to the emulsion side thereof; and on the celluloid side the only rubbing contact is against the raised curved tracks on the aperture plate. The other contacts of the film with parts of the mechanism are rolling contacts. The tension applied to the film strip by the aperture feed sprocket is just sufficient to overcome friction of the celluloid against the hardened steel runners on the aperture plate plus the load applied to the film by the fire shutter control sprocket, which load is just sufficient to cause the film to hug said runners. Thus, wear on the film is reduced to a minimum, and the danger of accidental damage to the film is eliminated, hence film will give longer service and the fire hazard will be reduced.

Having thus fully described my invention, what I claim is—

1. An aperture unit comprising an aperture frame, a continuous curved, sound and picture aperture plate mounted on said aperture frame, and laterally adjustable guiding means mounted on said aperture frame above and below said aperture plate, said guiding means being adapted and arranged to align continuously a film strip with respect to said aperture plate as said film strip is drawn continuously thereover by means external to said aperture unit, said film strip being held in contact with said curved aperture plate by a uniform drag applied to said film strip through means external to said aperture unit but in close proximity thereto.

2. An aperture unit comprising an aperture frame slidably mounted within a non-intermittent projector mechanism in a manner whereby said frame may be variously positioned along the optical axis of said mechanism, a continuous curved, sound and picture aperture plate mounted on said aperture frame, and laterally adjustable guiding means mounted on said aperture frame above and below said aperture plate, said guiding means being adapted and arranged to align continuously a film strip with respect to said aperture plate as said film strip is drawn continuously thereover by means external to said aperture unit, said film strip being held in contact with said curved aperture plate by a uniform drag applied to said film strip through means external to said aperture unit but in close proximity thereto.

3. An aperture unit comprising an aperture frame, a continuous curved, sound and picture aperture plate mounted on said aperture frame, a sphero-cylindrical aperture lens, means whereby said sphero-cylindrical lens may be supported in close proximity to and in line with the picture aperture in said aperture plate, and laterally adjustable guiding means mounted on said aperture frame above and below said aperture plate, said guiding means being adapted and arranged to align continuously a film strip with respect to said aperture plate as said film strip is drawn continuously thereover by means external to said aperture unit, said film strip being held in contact with said curved aperture plate by a uniform drag applied to said film strip through means external to said aperture unit but in close proximity thereto.

4. An aperture unit comprising an aperture frame, a continuous curved, sound and picture aperture plate mounted on said aperture frame, a complete sound pick-up unit mounted on said aperture frame; said sound pick-up unit including an exciter lamp, an exciter optical system, a photo-electric cell, and means for properly supporting said parts with respect to each other and with respect to said aperture frame; and laterally adjustable guiding means mounted on said aperture frame above and below said aperture plate, said guiding means being adapted and arranged to align continuously a film strip with respect to said aperture plate as said film strip is drawn continuously thereover by means external to said aperture unit, said film strip being held in contact with said curved aperture plate by a uniform drag applied to said film strip through means external to said aperture unit but in close proximity thereto.

5. An aperture unit comprising an aperture frame slidably mounted within a non-intermittent projector mechanism in a manner whereby said frame may be variously positioned along the optical axis of said mechanism, a continuous curved, sound and picture aperture plate mounted on said aperture frame, a sphero-cylindrical aperture lens, means whereby said lens may be supported in close proximity to and in alignment with the picture aperture in said aperture plate, a complete sound pick-up unit mounted on said aperture frame; said sound pick-up unit including an exciter lamp, an exciter optical system, a photo-electric cell, and means for properly supporting said parts with respect to each other and with respect to said aperture frame; and laterally adjustable guiding means mounted on said aperture frame above and below said aperture plate, said guiding means being adapted and arranged to align continuously a film strip with respect to said aperture plate as said film strip is drawn continuously thereover by means external to said aperture unit, said film strip being held in contact with said curved aperture plate by a uniform drag applied to said film strip through means external to said aperture unit but in close proximity thereto.

6. An aperture unit of the character specified, including an aperture frame slidably mounted within a non-intermittent projector mechanism in a manner whereby said aperture frame may be variously positioned along the optical axis of said mechanism, an aperture plate mounted on said aperture frame, a bracket mounted on said aperture frame below said aperture plate, a second bracket hingedly mounted on said first mentioned bracket, a film roller rotatably mounted in said second bracket, and means whereby said film roller may be variously positioned with respect to said aperture plate, thereby establishing the direction in which a film strip may be drawn from said aperture unit by film actuating means external thereto.

7. In a sound motion picture projector, an aperture unit including a curved aperture plate with sound and picture apertures, a power driven aperture feed sprocket adapted and arranged to draw a film strip over said aperture plate, a film-actuated sprocket adapted and arranged to apply tension upon the film strip overlying said aperture plate, the tension thus applied causing said film strip to conform faithfully to the curvature of said aperture plate thus eliminating the need for film gate and pressure pads in association with said apertures, and two additional power driven sprockets adapted and arranged to maintain free loops in the film strip as it approaches said film-actuated sprocket and as it leaves said aperture feed sprocket, the above mentioned four sprockets being all the sprockets required in said sound motion picture projector.

8. In a sound motion picture projector, an aperture unit including a curved aperture plate with sound and picture apertures, an aperture feed sprocket adapted and arranged to draw a film strip over said aperture plate, a second sprocket paired with said aperture feed sprocket through common idler roller operating mechanism and adapted and arranged to maintain a free loop in said film strip, a film-actuated sprocket adapted and arranged to apply tension upon that portion of film strip overlying said aperture plate, and a fourth sprocket paired with said film-actuated sprocket through common idler roller operating mechanism and adapted and arranged to maintain a second free loop in said film strip.

ARTHUR J. HOLMAN.